(12) United States Patent
Slaven, Jr. et al.

(10) Patent No.: US 11,175,116 B2
(45) Date of Patent: Nov. 16, 2021

(54) BAMBOO AND/OR VEGETABLE CANE FIBER BALLISTIC IMPACT PANEL AND PROCESS

(71) Applicant: Resource Fiber LLC, Homewood, AL (US)

(72) Inventors: Leland Slaven, Jr., Tampa, FL (US); David Knight, Bainbridge Island, WA (US)

(73) Assignee: Resource Fiber LLC, Sulligent, AL (US)

( * ) Notice: Subject to any disclaimer, the term of this patent is extended or adjusted under 35 U.S.C. 154(b) by 527 days.

(21) Appl. No.: 15/951,055

(22) Filed: Apr. 11, 2018

(65) Prior Publication Data
US 2018/0299230 A1    Oct. 18, 2018

Related U.S. Application Data

(60) Provisional application No. 62/484,810, filed on Apr. 12, 2017.

(51) Int. Cl.
*F41H 5/04* (2006.01)
*B32B 9/02* (2006.01)
(Continued)

(52) U.S. Cl.
CPC ............. *F41H 5/0471* (2013.01); *B32B 9/02* (2013.01); *F41H 5/0478* (2013.01); *B32B 7/02* (2013.01);
(Continued)

(58) Field of Classification Search
CPC combination set(s) only.
See application file for complete search history.

(56) References Cited

U.S. PATENT DOCUMENTS

| 221,720 A | 11/1879 | Colburn |
|---|---|---|
| 1,913,864 A | 6/1933 | Ora |

(Continued)

FOREIGN PATENT DOCUMENTS

| EP | 2272667 A1 | 1/2011 |
|---|---|---|
| GB | 1157621 A | 7/1969 |

(Continued)

OTHER PUBLICATIONS

International Searching Authority, International Search Report and Written Opinion, PCT Patent Application PCT/US2019/013713, dated Jun. 21, 2019, 10 pages.

(Continued)

*Primary Examiner* — Lynda Salvatore
(74) *Attorney, Agent, or Firm* — Perkins Coie LLP

(57) ABSTRACT

A vegetable cane fiber ballistic impact panel and process of manufacturing the ballistic panel. The ballistic panel includes a plurality of vegetable cane fibers (e.g., bamboo fibers) impregnated with a polymer. The vegetable cane fibers are formed into mats of interconnected and entangled fibers and the polymer is formed into polymer films. The polymer films and mats are arranged into a layered assembly having an alternating arrangement and pressed together. The layered assembly is heated to soften the polymer and allow it to flow around the vegetable cane fibers to impregnate the vegetable cane fibers and then cooled. The vegetable cane fibers are generally uniformly distributed through the entire thickness of the panel and vegetable cane fibers originally formed within different mats are entangled with each other.

14 Claims, 5 Drawing Sheets

(51) Int. Cl.
*B32B 27/28* (2006.01)
*B32B 7/02* (2019.01)

(52) U.S. Cl.
CPC ......... *B32B 27/285* (2013.01); *B32B 2571/02* (2013.01)

(56) References Cited

U.S. PATENT DOCUMENTS

| | | |
|---|---|---|
| 2,037,573 A | 4/1936 | Grant |
| 2,723,693 A | 11/1955 | Hayashiguchi et al. |
| 2,858,990 A | 11/1958 | Honeyman et al. |
| 3,289,371 A | 12/1966 | Pearson et al. |
| 3,358,336 A | 12/1967 | Chaikin et al. |
| 3,365,222 A | 1/1968 | Jack |
| 3,424,270 A | 1/1969 | Hartman et al. |
| 3,464,877 A | 9/1969 | Creighton et al. |
| 3,503,833 A | 3/1970 | Carlson |
| 3,605,360 A | 9/1971 | Lindal |
| 3,857,217 A | 12/1974 | Reps |
| 4,134,440 A | 1/1979 | Kawawa et al. |
| 4,137,685 A | 2/1979 | Fang et al. |
| 4,195,713 A | 4/1980 | Hagbjer et al. |
| 4,774,121 A | 9/1988 | Vollenweider, II |
| 4,799,961 A | 1/1989 | Friberg |
| 4,810,551 A | 3/1989 | Chu |
| 4,857,145 A | 8/1989 | Villavicencio |
| 4,924,648 A | 5/1990 | Gilb et al. |
| 4,932,178 A | 6/1990 | Mozingo |
| 4,985,119 A | 1/1991 | Vinson et al. |
| 5,030,289 A | 7/1991 | Sattler et al. |
| 5,047,086 A | 9/1991 | Hayakawa et al. |
| 5,048,581 A | 9/1991 | Pierson et al. |
| 5,150,553 A | 9/1992 | Commins et al. |
| 5,151,238 A | 9/1992 | Earl et al. |
| 5,161,591 A | 11/1992 | Sealey et al. |
| 5,167,710 A | 12/1992 | Leroux et al. |
| 5,196,061 A | 3/1993 | Thomas et al. |
| 5,271,996 A | 12/1993 | Tanabe et al. |
| 5,397,067 A | 3/1995 | Akiyama et al. |
| 5,415,821 A | 5/1995 | Irie et al. |
| 5,441,787 A | 8/1995 | Fujii et al. |
| 5,456,964 A | 10/1995 | Tamura et al. |
| 5,505,238 A | 4/1996 | Fujii et al. |
| 5,543,197 A | 8/1996 | Plaehn |
| 5,561,957 A | 10/1996 | Gauthier |
| 5,573,348 A | 11/1996 | Morgan |
| 5,679,191 A | 10/1997 | Robinson et al. |
| 5,733,671 A | 3/1998 | Bayasi |
| 5,738,924 A | 4/1998 | Sing |
| 5,741,589 A | 4/1998 | Fujii et al. |
| 5,759,463 A | 6/1998 | Chang |
| 5,786,063 A | 7/1998 | Shibusawa et al. |
| 5,813,182 A | 9/1998 | Commins |
| 5,814,170 A | 9/1998 | Shibusawa et al. |
| 5,876,649 A | 3/1999 | Ryan |
| 5,881,460 A | 3/1999 | Nowell, III et al. |
| 5,882,745 A | 3/1999 | Mi et al. |
| 5,972,467 A | 10/1999 | Washo et al. |
| 5,976,644 A | 11/1999 | Sanaee et al. |
| 5,980,672 A | 11/1999 | Ryan |
| 6,010,585 A | 1/2000 | Fujii et al. |
| 6,015,107 A | 1/2000 | Stegmeier |
| 6,086,804 A | 7/2000 | Akiyama et al. |
| 6,098,680 A | 8/2000 | Nien et al. |
| 6,180,211 B1 * | 1/2001 | Held ................ B32B 27/00 428/172 |
| 6,197,414 B1 | 3/2001 | Kawai et al. |
| 6,256,949 B1 | 7/2001 | Meierhofer |
| 6,281,148 B1 | 8/2001 | Dagher et al. |
| 6,383,652 B1 | 5/2002 | Templeton et al. |
| 6,391,435 B1 | 5/2002 | Akiyama et al. |
| 6,513,290 B2 | 2/2003 | Leek |
| 6,513,292 B2 | 2/2003 | Kumon |
| 6,564,837 B1 | 5/2003 | Lou |
| 6,576,331 B1 | 6/2003 | Ryan |
| 6,641,885 B2 | 11/2003 | Lou |
| 6,689,298 B2 | 2/2004 | Yoshida |
| 6,722,093 B2 | 4/2004 | Dauplay |
| 6,737,006 B2 | 5/2004 | Grohman |
| 6,773,500 B1 | 8/2004 | Creamer et al. |
| 6,841,231 B1 | 1/2005 | Liang et al. |
| 6,872,246 B2 | 3/2005 | Merkley et al. |
| 6,875,503 B1 | 4/2005 | Famy et al. |
| 6,929,841 B1 | 8/2005 | Van Dijk et al. |
| 6,976,345 B2 | 12/2005 | Keshmiri |
| 7,147,745 B1 | 12/2006 | Slaven et al. |
| 7,152,379 B2 | 12/2006 | Lin et al. |
| 7,160,053 B2 | 1/2007 | Chang |
| 7,166,181 B2 | 1/2007 | Cable |
| 7,172,136 B2 | 2/2007 | Leon |
| 7,225,591 B2 | 6/2007 | Lin et al. |
| 7,276,551 B2 | 10/2007 | Pageau |
| 7,537,031 B2 | 5/2009 | Jarck |
| 7,785,681 B2 | 8/2010 | Liao |
| 7,908,808 B2 | 3/2011 | Hundegger |
| 7,914,637 B2 | 3/2011 | Pedoja |
| 7,939,156 B1 | 5/2011 | Slaven et al. |
| 8,075,735 B2 | 12/2011 | Jarck |
| 8,173,236 B1 | 5/2012 | McDonald |
| 8,231,757 B2 | 7/2012 | Lin et al. |
| 8,245,742 B2 | 8/2012 | Filion et al. |
| 8,268,430 B2 | 9/2012 | Johnson et al. |
| 8,561,373 B1 | 10/2013 | McDonald et al. |
| 8,667,744 B2 | 3/2014 | Shaw |
| 8,672,600 B2 | 3/2014 | Reznar et al. |
| 8,776,316 B2 | 7/2014 | Mcroskey et al. |
| 9,624,609 B2 | 4/2017 | Rumeau et al. |
| 9,937,685 B2 | 4/2018 | Slaven, Jr. et al. |
| 10,087,630 B2 * | 10/2018 | Hebel .................. B27N 3/00 |
| 10,266,987 B2 | 4/2019 | Slaven, Jr. et al. |
| 10,597,863 B2 | 3/2020 | Slaven et al. |
| 2002/0095897 A1 | 7/2002 | Summerford |
| 2003/0009980 A1 | 1/2003 | Shahnazarian |
| 2003/0079804 A1 | 5/2003 | Hsu |
| 2003/0207098 A1 | 11/2003 | Ryan |
| 2004/0191448 A1 | 9/2004 | Wu |
| 2005/0048273 A1 | 3/2005 | Ryan |
| 2005/0087904 A1 | 4/2005 | Bryan |
| 2005/0161852 A1 | 7/2005 | Decker et al. |
| 2005/0163990 A1 | 7/2005 | Chang |
| 2005/0173089 A1 | 8/2005 | Liang et al. |
| 2008/0023868 A1 | 1/2008 | Slaven et al. |
| 2010/0178451 A1 | 7/2010 | Li |
| 2013/0210309 A1 | 8/2013 | Kim et al. |
| 2014/0000761 A1 | 1/2014 | Peng |
| 2014/0208688 A1 | 7/2014 | Vitullo |
| 2015/0129698 A1 | 5/2015 | Olson et al. |
| 2015/0158263 A1 | 6/2015 | Maddala et al. |
| 2015/0197069 A1 | 7/2015 | Basquin et al. |
| 2015/0197396 A1 | 7/2015 | Simons et al. |
| 2015/0275428 A1 | 10/2015 | Slaven et al. |
| 2017/0030089 A1 | 2/2017 | Zhang et al. |
| 2017/0260755 A1 | 9/2017 | Sherstad et al. |
| 2017/0299198 A1 | 10/2017 | Collins et al. |
| 2017/0356193 A1 | 12/2017 | Song et al. |
| 2018/0010298 A1 | 1/2018 | Slaven, Jr. et al. |
| 2018/0354562 A1 | 12/2018 | Slaven, Jr. et al. |
| 2019/0226196 A1 | 7/2019 | Slaven, Jr. et al. |

FOREIGN PATENT DOCUMENTS

| | | |
|---|---|---|
| JP | 2000351160 A | 12/2000 |
| JP | 4791437 B2 | 10/2011 |
| WO | 2009146254 A1 | 12/2009 |

OTHER PUBLICATIONS

International Searching Authority, International Search Report and Written Opinion, PCT Patent Application PCT/US2019/025550, dated Jun. 26, 2019, 12 pages.

* cited by examiner

BAMBOO AND/OR VEGETABLE CANE FIBER BALLISTIC IMPACT PANEL AND PROCESS

CROSS-REFERENCE TO RELATED APPLICATION(S)

This non-provisional patent application claims the benefit of and priority to U.S. Provisional Patent Application No. 62/484,810, titled "BAMBOO AND OR VEGETABLE CANE COMPOSITE BALLISTIC/IMPACT PANEL AND PROCESS" and filed Apr. 12, 2017, which is incorporated herein in its entirety by reference thereto.

TECHNICAL FIELD

Embodiments of the present technology relate to ballistic impact panels for apparel and structural building components that offer penetration protection from projectiles.

BACKGROUND

Ballistic panels are used in a wide variety of applications to provide impact resistance and to protect structures and/or people adjacent to the structures from damage due to impact from high velocity objects. For example, doors, desks, furniture, panels, or other items can include or incorporate ballistic panels that can prevent high velocity projectiles (e.g., bullets, etc.) from penetrating through the structure. Such doors, desks, furniture, panels, or other structures can be used to provide a structure behind which one or more people can take cover during, as an example, an active shooter situation. In another example, some buildings are formed with ballistic panels in the siding of the building, so as to provide protection to the building from high velocity projectiles, such as rocks, branches, or flying debris during hurricanes, or tornadoes, or other powerful storms. Bulletproof vests worn by the police and the military can also include ballistic panels that can prevent bullets or other projectiles from penetrating the vests and seriously injuring wearer. Conventional ballistic panels are typically formed from rigid materials such as fiber-glass, steel, titanium, ceramic, and composites thereof. Ballistic panels formed from some of these materials are typically very heavy and are expensive, labor intensive and energy intensive to manufacture. The materials are also often difficult to recycle after being used and can consume the same amount of energy or more to manufacture next life products, and are typically heavy and difficult to handle. Accordingly, there is a need for improved ballistic panels that are easier to produce and install, are lighter, and are readily recyclable.

DETAILED DESCRIPTION

The present disclosure describes ballistic panels and methods of manufacturing the ballistic panels in accordance with certain embodiments of the present technology. Several specific details of the technology are set forth in the following description and the Figures to provide a thorough understanding of certain embodiments of the technology. One skilled in the art, however, will understand that the present technology can have additional embodiments, and that other embodiments of the technology can be practiced without several of the specific features described below.

Figure 1:
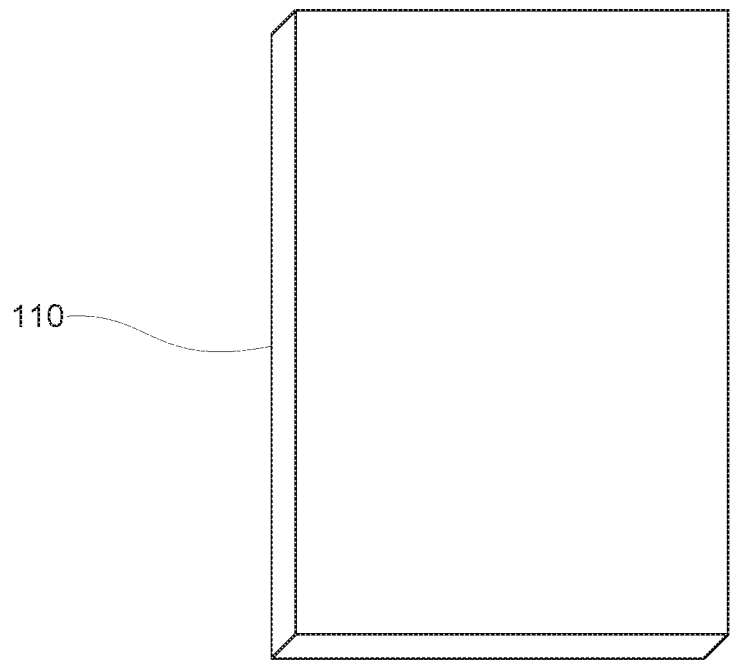
FIG. 1 is a schematic isometric view of a ballistic panel in accordance with one or more embodiments of the present technology.
Figure 2:
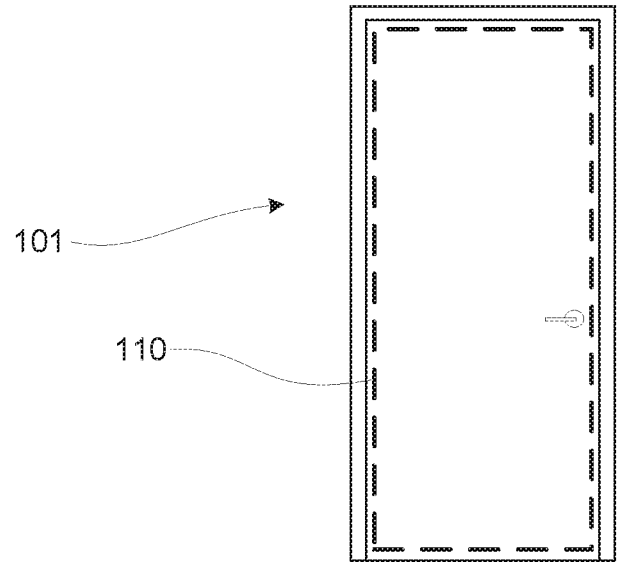
FIG. 2 is a front elevation view of a door having a ballistic panel in accordance with embodiments of the present technology.

FIG. 1 shows an isometric view of a bulletproof panel 110 of the type that can be incorporated into doors, panels, furniture, walls, bullet-proof vests, vehicles, or other shielding structures. The ballistic panel 110 is configured to prevent high-energy projectiles from penetrating through the panel 110. The ballistic panels 110 is shown having a rectangular shape, but the panel can have other shapes and sizes depending upon the intended use of the ballistic panel. FIG. 2 is a front elevation view of a door 101 that can include one or more ballistic panels 110. The ballistic panel 110 can be fully enclosed within the door 101 and can be positioned to stop projectiles such as bullets or debris from penetrating through the door 101. The ballistic panel 110 can be sized and shaped to substantially cover the entire door 101 such that a single ballistic panel 110 substantially covers the entire door 101. Alternatively, the entire door 101 can be made of one or more ballistic panels 110.

Figure 3:
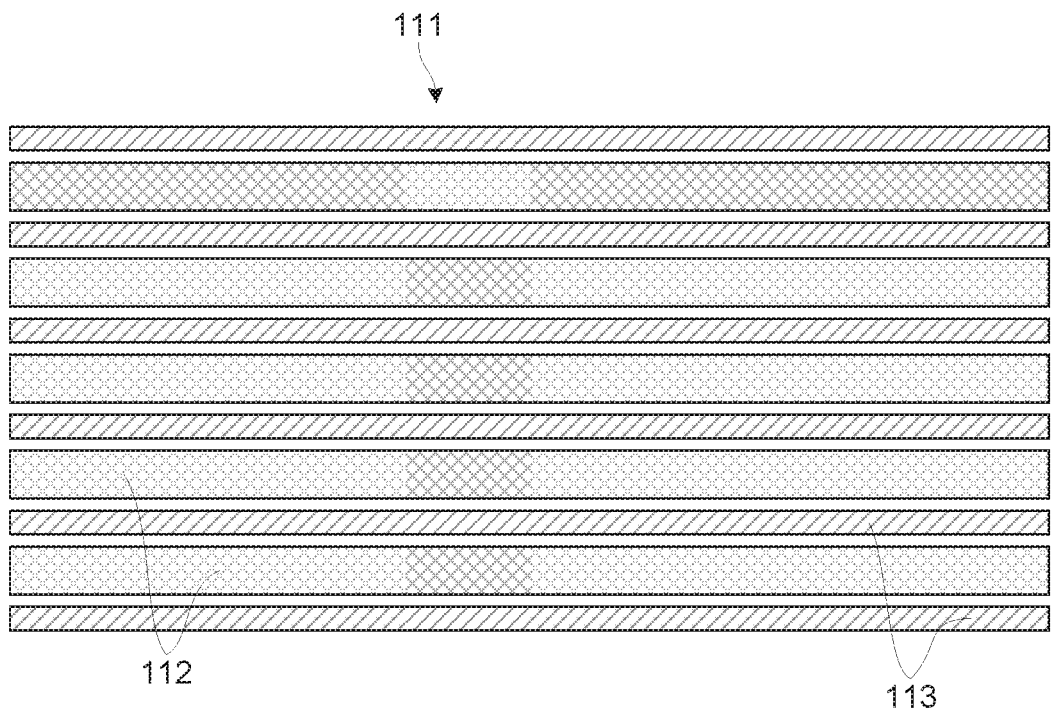
FIG. 3 is an exploded cross-sectional view of the ballistic panel taken during an intermediate point of the manufacturing process of the ballistic panel.

In the embodiment illustrated in FIG. 3, the ballistic panel 110 is formed from a layering process wherein bamboo mats 112 are alternatingly arranged with polymer films 113 during the manufacturing process. FIG. 3 is an exploded cross-sectional view of a layered assembly 111 formed as part of an intermediate step while manufacturing the ballistic panel 110. The layered assembly 111 includes alternately arranged bamboo mats 112 and polymer films 113, such that each bamboo mat 112 is positioned between two adjacent polymer films 113. The layered assembly 111 shown in FIG. 3 includes five bamboo mats 112 alternatingly arranged with six polymer films 113 stacked together. In other embodiments, the layered assembly 111 can include a different number of bamboo mats 112 and polymer films 113. For example, the layered assembly 111 can include 10 bamboo mats 112 alternatingly arranged with 11 polymer films 113, three bamboo mats 112 alternatingly arranged with four polymer films 113, or any other suitable number of bamboo mats 112 and polymer films 113.

In general, thicker ballistic panels formed from a relatively high number of bamboo mats 112 and polymer films 113 have a higher strength and offer greater penetration protection from projectiles than thinner ballistic panels formed from a relatively low number of bamboo mats 112 and polymer films 113. Accordingly, the ballistic panels 110 can be manufactured to provide a selected amount of protection by forming the ballistic panels from a selected number of bamboo mats and polymer film layers. For example, in some embodiments, the ballistic panels 110 are configured to provide protection from relatively low-energy projectiles, wherein the ballistic panels 110 can be formed from five layers of bamboo mats 112 and six polymer layers 113, and the ballistic panel can have a thickness of approximately up to about 0.5 inches. However, in other embodiments, the ballistic panels 110 are configured to provide protection from relatively high-energy projectiles, such as shrapnel from explosives or bullets from high-caliber weapons. In these embodiments, the ballistic panels 110 can be formed from a greater number of alternating bamboo mats 112 and polymer layers 113, such that the ballistic panel 110 can have a thickness in the range of approximately ⅝ inch to 1 inch or more.

Each of the bamboo mats 112 includes a plurality of high-strength, elongated bamboo fibers positioned in random orientations and pressed together to form a selected shape, such as a generally rectangular shape. Bamboo and other vegetable canes are very fibrous and are popular for use as building and textile materials. The cylindrical bamboo stalks or culms have a plurality of nodes spaced apart along their length and include fibers that extend substantially parallel to the length of the culms. The bamboo culms can be flattened and processed into boards having high strength comparable to that of more traditional building materials (e.g., wood, steel, concrete, etc.) while being substantially cheaper to produce and manufacture and lighter than the traditional building materials. Further details of a bamboo manufacturing and conditioning process that can be used are disclosed in further detail in U.S. patent application Ser. No. 14/673,659, filed Mar. 30, 2015 and titled "APPARATUS AND METHOD FOR PROCESSING BAMBOO OR VEGETABLE CANE," which is incorporated herein in its entirety by reference.

Figure 4:
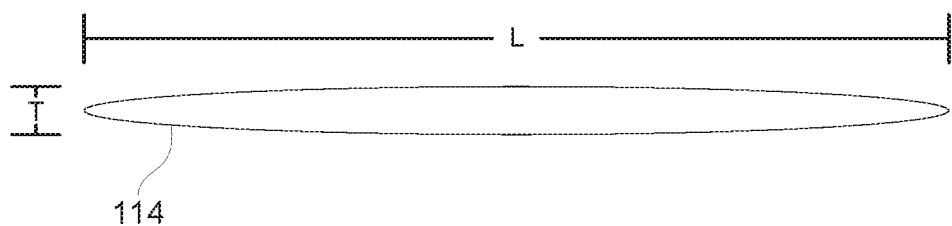
FIG. 4 is a plan view of a bamboo fiber that can be used to form the ballistic panel in accordance with embodiments of the present technology.

Bamboo fibers and bundles of bamboo fibers generated during the above-referenced manufacturing and conditioning process can be collected and, if needed, to one or more selected lengths. FIG. 4 shows a plan view of a bamboo fiber bundle 114 having a length L and a width W. In some embodiments, portions of the bamboo culms processed to generate the bamboo fiber bundles 114 have a length L between approximately 0.25 inches to 24 inches or more, and can have a width W of less than 0.1 inches. In other embodiments, the bamboo fibers and/or the bundles 114 can have a length of approximately 1 inch, between 1 inch and 12 inches, between 12 inches and 24 inches, or greater than 24 inches and a width W of approximately 0.1 inches, between 0.0625 and 0.125 inches, less than 0.0625 inches, or between 0.01 and 0.02 inches.

Figure 5:
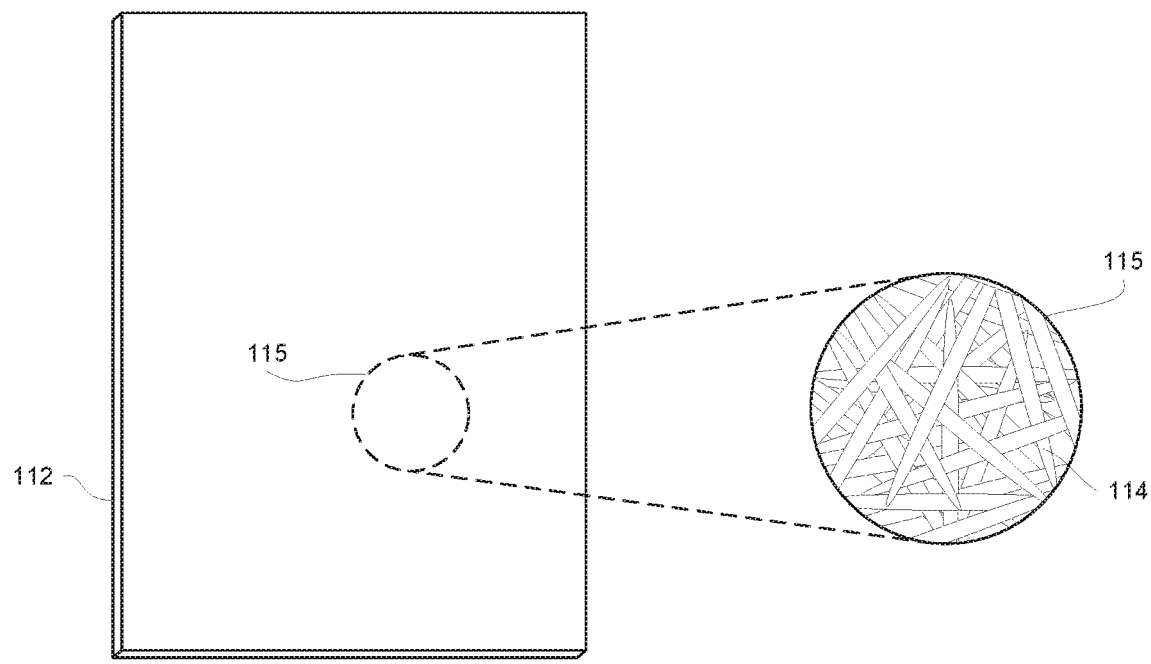
FIG. 5 is a plan view of a bamboo mat that is formed from the bamboo fibers of FIG. 4 and shows an enlarged view of a portion of the mat that illustrates the arrangement of the bamboo fibers.

The collected bamboo fibers and/or the fiber bundles 114 are arranged into a bamboo mat with randomly oriented bamboo fibers and bundles. FIG. 5 shows a plan view of a single bamboo mat 112 formed from the bamboo fibers 114 and shows an enlarged view of a portion 115 of the bamboo mat 112. The bamboo mats 112 can be generally rectangular and can be manufactured to have a selected thickness, such as in the range of approximately 0.01 inches and 0.5 inches. The bamboo mats 112 can be formed using either a wet lay-up process or a dry lay-up process. In embodiments where the bamboo mats 112 are formed using the wet lay-up process, the bamboo fibers 114 are mixed with a fluid, such as water and/or other liquids, to soften the bamboo fibers 114 and to form a moldable slurry wherein the bamboo fibers are arranged in random orientations relative to each other. The slurry can be poured into a mold or container and the water can be removed, resulting in the softened bamboo fibers being generally flattened. The wet bamboo fibers 114 can then be dried to remove the remaining water and to form the bamboo mats 112 having the selected thickness. In embodiments where the bamboo mats 112 are formed using dry lay-up process is used, the bamboo fibers 114 can be arranged on a flat surface and mixed together so the bamboo fibers 114 are arranged in random orientations, and the collection of the bamboo fibers have a selected, generally uniform thickness. The bamboo fibers 114 can then be flattened (e.g., using a press or using pinch rollers) to the selected thickness. When the bamboo mats 112 are formed using either the wet lay-up process or the dry lay-up process, the bamboo fibers 114 form an interconnected web of random fibers within each of the bamboo mats 112.

Each of the polymer films 113 (FIG. 3) can be formed from a thin film of polymer having a thickness between 0.01 inches and 0.1 inches. The polymer can be a selected thermosetting polymer configured to soften and flow when exposed to high temperatures before curing into a rigid material. For example, the polymer can be polypropylene, HDPE, LDPE, Nylon, some other polymer, or even a blend of multiple polymers. When the polymer films 113 and the mats 112 are layered together in the alternating arrangement, and the layered assembly is exposed to heat and pressure, so as to melt the polymer film or otherwise render it flowable. The levels of heat and pressure are selected to cause the polymer to flow through and around the individual bamboo fibers 114 of the bamboo mats 12 adjacent to the film 113, so that the bamboo fibers 114 will become impregnated with and/or encapsulated by the polymer. In this way, the polymer and the bamboo fibers 114 securely bond together, and bamboo fibers within adjacent bamboo mats 112 are permanently coupled together.

The ballistic panel 110 of the illustrated embodiment is configured with a selected percentage by weight of bamboo by selecting the thickness of the polymer films with respect to the thickness of the bamboo mats 112. For example, the thicknesses of the polymer films and the bamboo mats can be selected such that the bamboo mats 112 are approximately 1.5 to 3.5 times as thick as the polymer films. In this way, the ballistic panels 110 can be manufactured such that the bamboo fibers make up 5-50%, 20-45%, 25-35%, or some other selected percentage of the total weight.

Figure 6:
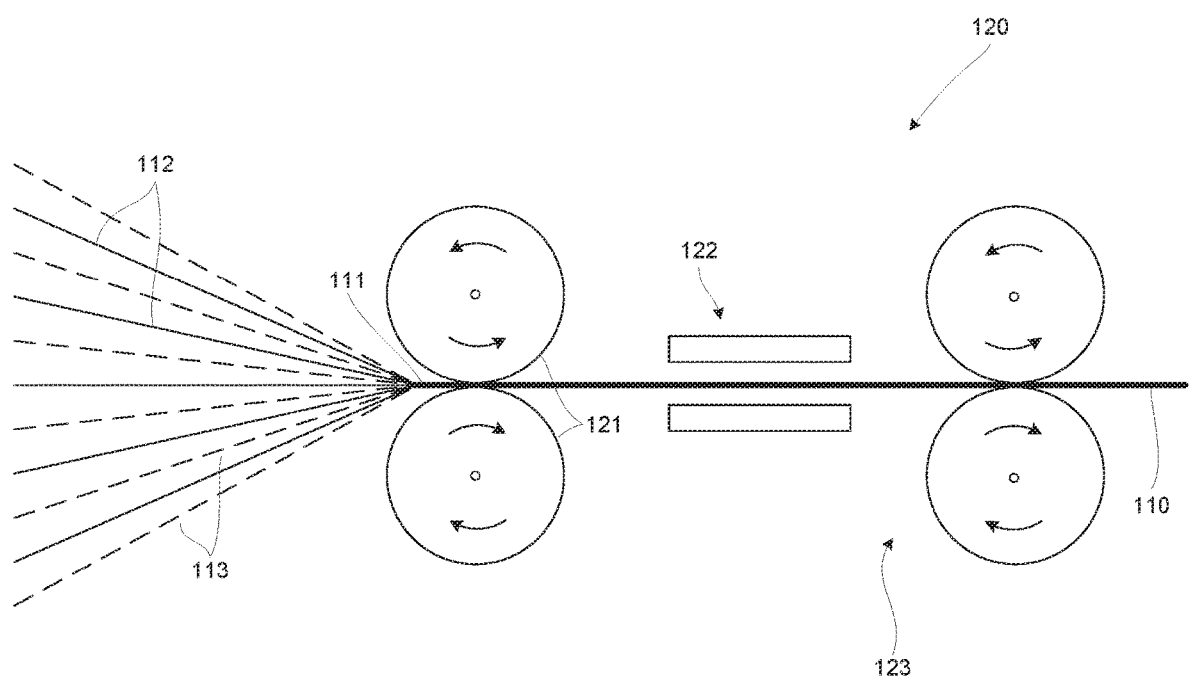
FIG. 6 is a schematic view of a manufacturing assembly that is used to form the ballistic panel, in accordance with embodiments of the present technology.

FIG. 6 shows a schematic view of a manufacturing assembly 120 that can utilize rollers, such as pinch rollers 121, and one or more heaters 122 to form the ballistic panel 110. In some embodiments, the rollers may be heated rollers. The layered assembly 111 can be fed into the pinch rollers 121, which apply a selected pressure on layered assembly 111 to press the heated bamboo mats 112 and the flowable polymer films 113 together. In this way, the polymer can be pressed into and fully around the bamboo fibers to help the polymer bind to the bamboo fibers. Further, the applied force from the pinch rollers can push bamboo fibers within adjacent mats to interact and become entangled with each other. In some embodiments, the pinch rollers 121 can be used to apply a force in the range of approximately 45 tons to 450 tons onto the layered assembly 111.

In the illustrated embodiment, the plurality of bamboo mats 112 and the polymer films 113 are heated by the heating assembly 122 to temperatures in the range of approximately 300° F. to 400° F. At these temperatures, the polymer softens and flows around the bamboo fibers to at least partially impregnate the bamboo fibers. In this way, the polymer surrounds and encapsulates the bamboo fibers. As the polymer flows between the bamboo mats 112 and the bamboo fibers become more entangled with fibers in adjacent bamboo mats 112, the distinct layers of the layered assembly 111 begin to disappear and may no longer be readily or visually distinguishable from each other. Accordingly, the resulting ballistic panel 110 can be generally homogenous throughout. In the illustrated embodiment, the heating assembly 122 includes heated platens positioned adjacent to opposing sides of the compressed stack. In one or more embodiments, the heating assembly 122 can include one or more heated platens positioned over the top surface and/or the bottom surface of the mat. In still other embodiments, the heating assembly 122 can include a different heating mechanism, such as heating coils.

As the heated polymer flows around and impregnates the bamboo fibers, the polymer can begin to cure and harden. To increase the cooling and curing rate of the polymer, the heated and compressed layered assembly 111 can be provided to a cooling assembly 123, which can be used to cool the layered assembly 111. In some embodiments, the cooling assembly 123 can be cold rollers positioned "downstream" of the initial sets of pinch rollers, such that the cold rollers 123 cool the bamboo panels after the polymer films 113 and bamboo mats 112 have been heated and pressed together. Once cooled, the polymer can be completely cooled and the resulting ballistic panel 110 can be generally rigid. In the illustrated embodiment, the cooling assembly 123 includes cold rollers that are configured to simultaneously cool and press the layered assembly 111 together, thereby helping to ensure that the bamboo fibers and the polymer remain bonded to each other as the assembly 111 cools. In other embodiments, the cooling assembly 123 can include other cooling mechanisms, such as a cooling chamber.

In the illustrated embodiment, the manufacturing assembly 120 includes a single set of pinch rollers 121. In other embodiments, the manufacturing assembly 120 includes multiple sets of pinch rollers 121, where each set of pinch rollers 121 can be used to apply the same amount of force or a different amount of force. In these embodiments, some of these multiple sets of pinch rollers can be configured to receive and compress the stack of bamboo mats 112 and polymer films 113 after the stack passes through the heating assembly 122 but before reaching the cooling assembly 123. In still other embodiments, the pinch rollers 121 can be heated pinch rollers and can be configured to heat and compress the bamboo mats 112 and the polymer films 113 simultaneously. In these embodiments, the manufacturing assembly 120 may not include a separate heating assembly 122. After the ballistic panel is formed and cooled, the panel can be cut, machined, or otherwise finished to a selected shape. In addition, other layering, such as face layers or the like, can be applied to the ballistic panel 110. The finished ballistic panel 110 can then be formed into or otherwise incorporated into a selected end-use structure.

In operation, when the ballistic panel 110 is impacted by a projectile, the bamboo fibers immediately adjacent to the area impacted by the projectile are pulled and deformed by the projectile. However, the high-strength bamboo fibers in the ballistic panel 110 are entangled with adjacent bamboo fibers such that, when the impacted bamboo fibers move and deform, they pull on adjacent bamboo fibers, thereby utilizing the high tensile strength of the bamboo fibers. In turn, these bamboo fibers move and deform and subsequently pull on even more bamboo fibers. However, the rigid polymer that surrounds and encapsulates the bamboo fibers prevents the bamboo fibers from readily deforming and slows the movement of the bamboo fibers. As a result, the force of the impact is spread out over the ballistic panel 110, and the projectile quickly and efficiently loses energy so the projectile is unable to penetrate completely through the ballistic panel 110. In the case of a bullet impacting the ballistic panel 110, the impact with the panel will also cause the bullet to substantially deform, thereby further reducing energy and penetrating power of the bullet during impact.

To further increase the amount of protection offered by the ballistic panel 110, the ballistic panel 110 can include additional anti-penetration and impact resistance features. For example, in some embodiments, the ballistic panel 110 can include a strike plate. The strike plate can be a generally hard and stiff material and that is used to deflect and/or deform the projectile before it reaches the bamboo fibers. In this way, the strike plate can be used to reduce the impact energy of the projectile and therefore decrease the ability of the projectile to penetrate completely through the ballistic panel 110. In other embodiments, multiple of the ballistic panels 110 can be stacked and coupled together to further increase impact resistance. The individual ballistic panels 110 can be laminated together and can also include a basalt layer between adjacent ballistic panels 110 configured to extinguish incendiary rounds fired from a firearm.

In the illustrated embodiment, the polymer film 113 is formed from a thin layer of polymer that does not include any additives or additional materials. In other embodiments, the polymer film 113 can include small pieces of bamboo or other vegetable fibers and/or dust. For example, when bamboo culms or other fibrous vegetable cane are conditioned and flattened, small pieces of fibers and dust may be left over. These remaining pieces of bamboo or vegetable fibers can be mixed with a selected polymer and formed into biocomposite beads. In at least one embodiment, the small bamboo fibers are conditioned to a selected one of a plurality of sizes or meshes. For example, the small bamboo fibers can be segments of about 0.010"-0.020" thick and about ⅛"-¼" long, and the fibers can be mixed or compounded with a selected polymer, such as polypropylene, HDPE, LDPE, Nylon, or other plastic, or polymers, or blends of polymers to form the bio beads. A plurality of compounded biocomposite beads with different percentages of conditioned bamboo fiber compounded with polymers can be used to produce a bio-composite polymer with improved mechanical properties suitable for use forming the films of the ballistic panel 110.

In one embodiment, the bio-composite beads contains 5% bamboo fiber by weight compounded with a matrix of polypropylene or other suitable polymer material. Other illustrated sets of the bio-composite beads contain 10%, 15% and 20% bamboo fiber by weight, respectively, compounded with a polypropylene matrix. Other embodiments can have different concentrations of the bamboo fibers. In one embodiment, the composite material forming the beads can comprise a bamboo fiber concentration in the range of approximately 2%-25%, or approximately 5%-20%, or approximately 8%-15%. Other embodiments of the compounded composite can have the bamboo or vegetable cane fibers in combination with a polymer matrix of different concentrations depending upon the desired mechanical properties of the composite material. The biocomposite beads containing the bamboo or vegetable cane fibers can then be heated and molded or otherwise formed into a selected film or other shape. For example, these bio-composite beads can be melted down and formed into the polymer film 113 such that the polymer film 113 now includes the small pieces of bamboo and the bamboo dust. When the ballistic panel 110 is formed, these bamboo pieces flow into the bamboo mats 112 with the polymer and can help to prevent the bamboo fibers from deforming when the panel is impacted by a projectile.

Figure 7:
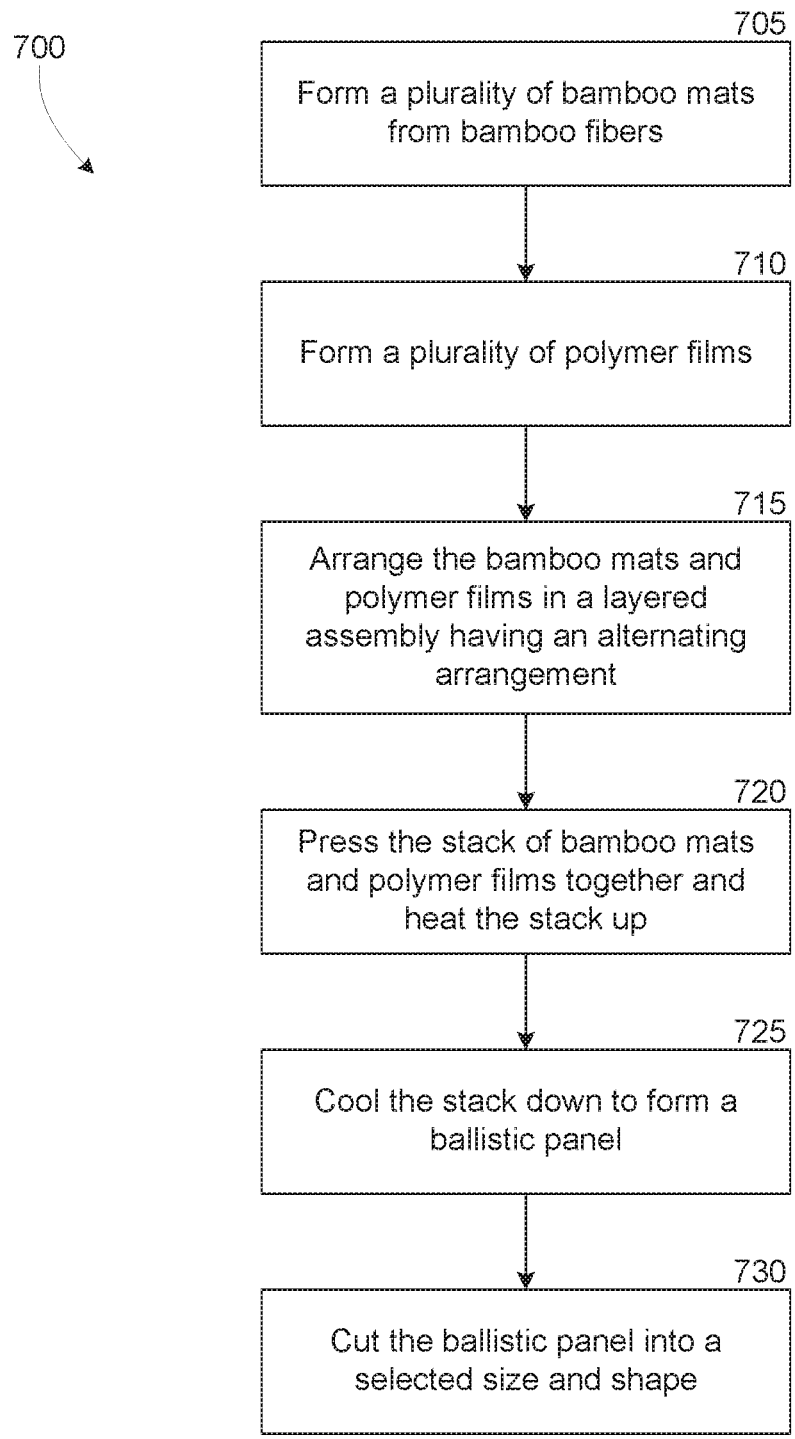
FIG. 7 shows a method of manufacturing the ballistic panel in accordance with embodiments of the present technology.

FIG. 7 shows a method of manufacturing a ballistic panel that includes bamboo fibers and a polymer. At step 705, a plurality of mats that include bamboo fibers is formed. The mats are formed using a wet lay-up process or a dry lay-up process. The bamboo fibers can have a length between 0.25 inches and 24 inches and can be randomly oriented such that adjacent bamboo fibers within the bamboo mat are generally not parallel or perpendicular to each other.

At step 710, a plurality of polymer films are formed. The polymer films can be formed from a thermosetting polymer configured to cure and become rigid when exposed to heat.

At step 715, the bamboo mats and the polymer films are stacked together in an alternating arrangement to form a layered assembly. The bamboo mats and polymer films can be stacked such that each bamboo mat is positioned between two different polymer films.

At step 720, a force is applied to the layered assembly and the layered assembly is heated. The force and increased temperatures causes the polymer to flow through the bamboo mats and causes the bamboo fibers within the mats to become entangled with bamboo fibers from adjacent mats. In some embodiments, the layered assembly can be pressed together using one or more pinch rollers or other type of presses and can be heated using heated platens configured to receive the layered assembly from the pinch rollers. In other embodiments, the pinch rollers can be heated pinch rollers configured to simultaneously heat and apply a force to the layered assembly without using heated platens.

At step 725, the heated and pressed layered assembly is cooled down using a cooling assembly so that the polymer begins to cure and the stack begins to harden. The cooling assembly can include cold rollers that simultaneously apply pressure and cool the layered assembly to ensure that the polymer and bamboo fibers remain bonded together.

At step 730, the cooled ballistic panel is cut into the desired size and shape and can be incorporated into a desired system.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A method of forming ballistic panels that include a plurality of vegetable cane fiber bundles and a polymer, comprising:
   providing a plurality of mats that include the vegetable cane fiber bundles, wherein each of the vegetable cane fiber bundles within a given one of the plurality of mats is randomly oriented with respect to adjacent vegetable cane fiber bundles within the mat;
   providing a plurality of films formed from the polymer;
   arranging the plurality of mats and the plurality of films into a layered assembly having an alternating arrangement such that each of the plurality of mats is positioned between two of the plurality of films;
   applying a force onto the layered assembly;
   heating the layered assembly, wherein heating the layered assembly softens the polymer so that the polymer at least partially impregnates the vegetable cane fibers; and
   cooling the layered assembly, wherein cooling the layered assembly causes the polymer to harden.

2. The method of claim 1, wherein
   the plurality of mats comprises a first mat and a second mat,
   the first mat comprises a first vegetable cane fiber bundle and the second mat comprises a second vegetable cane fiber bundle,
   the plurality of films comprises a first film interposed between the first and second mats, and
   applying the force onto the layered assembly causes the first vegetable cane fiber bundle to become entangled with the second vegetable cane fiber bundle.

3. The method of claim 1 wherein applying the force onto the layered assembly comprises applying the force onto the layered assembly using pinch rollers positioned to receive the layered assembly.

4. The method of claim 3 wherein heating the layered assembly comprises heating the layered assembly using heated platens positioned to receive the layered assembly from the pinch rollers.

5. The method of claim 3 wherein the pinch rollers comprise heated pinch rollers and wherein heating the layered assembly comprises heating the layered assembly using the heated pinch rollers.

6. The method of claim 3 wherein cooling the layered assembly comprises cooling the layered assembly using chilled rollers.

7. The method of claim 1 wherein each of the plurality of films includes the vegetable cane fibers.

8. The method of claim 1 wherein each of the vegetable cane fiber bundles within the given mat is entangled with at least one other vegetable cane fiber bundle within the given mat.

9. A system for assembling a ballistic panel, comprising:
   pinch rollers configured to receive a layered assembly and to apply pressure to the layered assembly, wherein the layered assembly comprises a plurality of bamboo mats and a plurality of polymer films layered together in an alternating arrangement, wherein each of the plurality of bamboo mats includes a plurality of bamboo fiber bundles, and wherein each of the bamboo fiber bundles within a given one of the plurality of bamboo mats is randomly oriented with respect to adjacent bamboo fiber bundles within the bamboo mat;
   a heating assembly configured to receive the layered assembly from the pinch rollers and to heat the layered assembly, and
   a cooling assembly configured to receive the layered assembly from the heating assembly and to cool the layered assembly.

10. The system of claim 9 wherein the heating assembly first and second heated platens and wherein the layered assembly is configured to pass between the first and second heated platens.

11. The system of claim 9 wherein the cooling assembly comprises cold rollers configured to simultaneously apply pressure and cool the layered assembly.

12. The system of claim 9 wherein the pinch rollers are configured to apply a force between 45 and 450 tons on the layered assembly.

13. The system of claim 9 wherein the plurality of bamboo mats comprises a first bamboo mat and a second bamboo mat, and wherein the pressure applied to the layered assembly causes a first bamboo fiber bundle of the first mat to become entangled with a second bamboo fiber bundle of the second bamboo mat.

14. The system of claim 9 wherein each of the bamboo fiber bundles within the given bamboo mat is entangled with at least one other bamboo fiber bundle within the given bamboo mat.

\* \* \* \* \*